United States Patent
Shimada et al.

(10) Patent No.: US 7,224,580 B2
(45) Date of Patent: May 29, 2007

(54) EXTERIOR ENCLOSURE FOR PORTABLE INFORMATION PROCESSOR, METHOD OF MANUFACTURING THE SAME, AND PORTABLE INFORMATION PROCESSOR USING THE ENCLOSURE

(75) Inventors: Isao Shimada, Hyogo (JP); Jun Sato, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 10 days.

(21) Appl. No.: 11/219,778

(22) Filed: Sep. 7, 2005

(65) Prior Publication Data

US 2006/0238965 A1 Oct. 26, 2006

(30) Foreign Application Priority Data

Apr. 22, 2005 (JP) ............................. 2005-124637

(51) Int. Cl.
*G06F 1/16* (2006.01)

(52) U.S. Cl. ............... 361/681; 361/683; 220/4.02; 220/327; 174/66; 174/367

(58) Field of Classification Search ............ 361/681, 361/686, 684, 683, 704; 220/359.2; 206/572, 206/232; 174/374; 345/87; 312/223.2; 445/25

See application file for complete search history.

(56) References Cited

U.S. PATENT DOCUMENTS

| | | | | |
|---|---|---|---|---|
| 2,604,507 A | * | 7/1952 | Tyson | ............... 174/374 |
| 4,739,316 A | * | 4/1988 | Yamaguchi et al. | .......... 345/87 |
| 5,497,296 A | * | 3/1996 | Satou et al. | ................ 361/681 |
| 5,504,648 A | * | 4/1996 | Honda et al. | ............... 361/686 |
| 5,544,007 A | * | 8/1996 | Inoue | .......................... 361/684 |
| 5,715,139 A | * | 2/1998 | Nakajima | .................... 361/683 |
| 6,525,932 B1 | * | 2/2003 | Ohnishi et al. | ............. 361/686 |
| 6,800,010 B1 | * | 10/2004 | Hibino et al. | ................. 445/25 |
| 7,019,976 B1 | * | 3/2006 | Ahmad et al. | ............. 361/704 |
| 7,072,184 B2 | * | 7/2006 | Kalyandurg | ................ 361/704 |
| 2003/0062370 A1 | * | 4/2003 | Ball et al. | ................ 220/359.2 |
| 2003/0137801 A1 | | 7/2003 | Shimada et al. | |
| 2003/0184962 A1 | * | 10/2003 | Kambayashi et al. | ....... 361/683 |
| 2004/0241528 A1 | * | 12/2004 | MacColl et al. | ............ 206/232 |

FOREIGN PATENT DOCUMENTS

JP    2003-204174    7/2003

* cited by examiner

*Primary Examiner*—Thao X. Le
*Assistant Examiner*—Xiaoliang Chen
(74) *Attorney, Agent, or Firm*—Wenderoth, Lind & Ponack, L.L.P.

(57) ABSTRACT

An exterior enclosure has an elevated portion forming a top plane. The elevated portion is surrounded by two pairs of mutually opposed ridge lines. The top plane is formed to have a concavely curved surface with respect to one of the two pairs of ridge lines. The exterior enclosure is manufactured by fixing a plate-shaped metallic blank material in place and pressing the blank material in a heated condition so that the elevated portion is formed with the top plane formed thereon. In the forming process of the elevated portion, the elevated portion is so formed as to have a concavely curved surface with respect to one of the two pairs of the ridge lines.

12 Claims, 4 Drawing Sheets

EXTERIOR ENCLOSURE FOR PORTABLE INFORMATION PROCESSOR, METHOD OF MANUFACTURING THE SAME, AND PORTABLE INFORMATION PROCESSOR USING THE ENCLOSURE

BACKGROUND OF THE INVENTION

1. Technical Field

The present invention relates to an exterior enclosure for housing a portable information processor, such as a notebook-size computer and a personal digital assistance, and to a method of manufacturing the enclosure.

2. Background Art

Recently, improvements have been made in providing lightweight portable information processors, such as a notebook-size computer and a personal digital assistance. Under these circumstances, a lightweight and strong material such as magnesium alloy has come to be widely used in producing the exterior enclosure of a display section incorporating therein a liquid crystal display device. Further, in the manufacture of such a exterior enclosure, a method of press forming of plate material capable of producing thinner walled products to achieve reduction in weight has come to be adopted rather than a method of manufacturing them by melt-shaping, such as magnesium die-casting.

FIG. 4 is a sectional view of the display section of a conventional portable information processor. This drawing illustrates a structure based on the design values. Enclosure back panel 31 covers liquid crystal display device 32 from behind. Enclosure back panel 31 has elevated portion 31A raised along ridge lines 31B. Elevated portion 31A has its surface formed flat to provide top plane 31C. In front of liquid crystal display device 32, there is disposed enclosure front panel 33.

Such a structure as described above is called a bonnet structure. The bonnet structure is used when fabricating an enclosure with a thin-walled material. When fabricated in a bonnet structure, the strength of enclosure back panel 31 is enhanced. An example in which such a bonnet structure is applied to an enclosure of a portable information processor is disclosed, for example, in Unexamined Japanese Patent Publication No. 2003-204174.

Fabrication sequence of enclosure back panel 31 in the press forming process will be described below. FIG. 5 is a schematic diagram showing a process for fabricating enclosure back panel 31 by the press forming method. Plate-shaped blank material 44 of magnesium alloy is sandwiched between blank holder 46 and die set 43 and pressed down by punch 42, in a condition heated by heater 45.

At the time when elevated portion 31A is formed by press forming, however, a material distortion occurs around ridge line 31B. Accordingly, elevated portion 31A is deviated from flatness and deformed wavy. In cases where the material is magnesium alloy, it is generally practiced to perform the press forming operation at temperatures above 200° C. to prevent cracks from being formed due to bending the material. During the course of this heating, thermal expansion occurs in the material. Therefore, when a material as above is used, volume of the material becomes more than that of necessity in particular, and hence elevated portion 31A is deformed into a sagged and swelled shape. FIG. 6 is a sectional view of enclosure back panel 31 in which such a shape is represented with exaggerated dimensions for the sake of explanation. The difference between the convexed and concaved levels in actuality is only around ±0.5 mm. However, when the surface is deformed to have irregular concavity and convexity, it impairs the appearance. In addition, the convexed portion is easily dented when subjected to a slight external force. Thus, the surface loses its tautness and its dent resistance is significantly deteriorated.

SUMMARY OF THE INVENTION

An exterior enclosure of the present invention has an elevated portion providing a top plane thereon. The elevated portion is surrounded by two pairs of opposed ridge lines. The top plane has a concavely curved surface with respect to one of the pairs of ridge lines. This structure enhances the strength of the top plane. Such an exterior enclosure is fabricated by a process in which a plate-shaped metallic blank is fixed in place and then pressed in a heated condition such that the elevated portion constituting the top plane is shaped. In shaping the elevated portion, it is arranged such that the elevated portion has a concavely curved surface with respect to one of the two pairs of ridge lines. Thus, occurrence of the material distortion due to the press-forming fabrication method and formation of the concavity and convexity on the elevated portion caused by thermal expansion due to the press forming carried out at high temperatures can be prevented. As a result, a stable shape can be secured.

DETAILED DESCRIPTION OF THE PREFERRED EMBODIMENTS

Figure 1A:
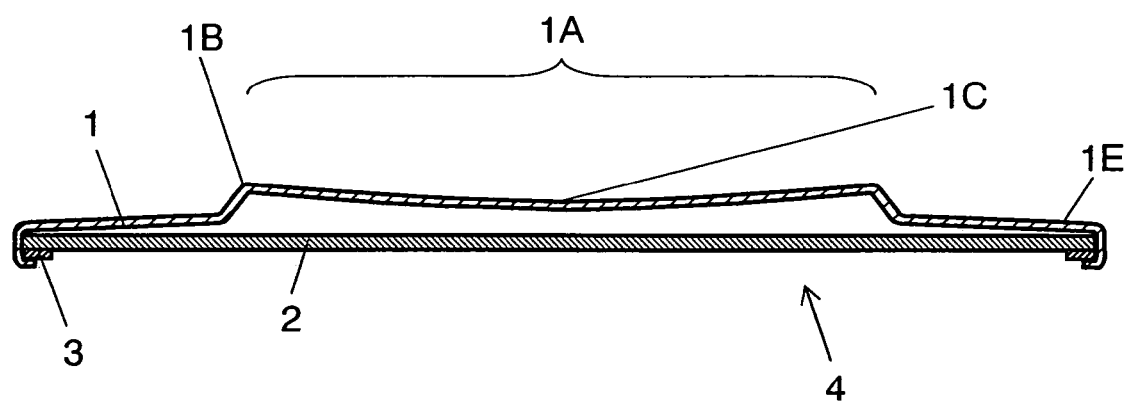
FIG. 1A is a sectional view of a display section of a portable information processor according to an embodiment of the present invention.
Figure 1B:
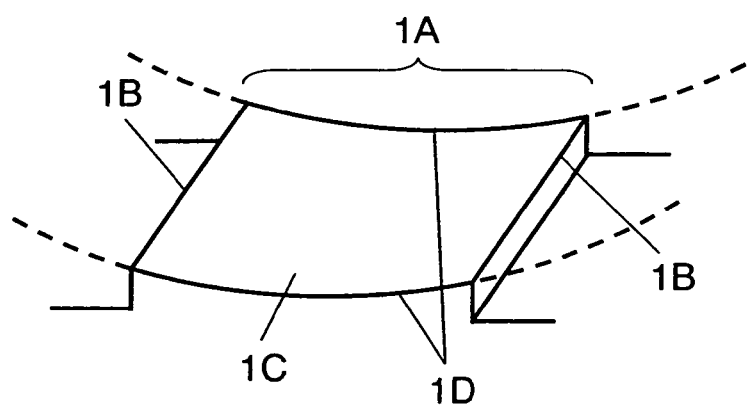
FIG. 1B is an enlarged perspective view of a main portion of an enclosure back panel of the display section shown in FIG. 1A.

FIG. 1A is a sectional view of a display section of a portable information processor according to an embodiment of the present invention. FIG. 1B is an enlarged perspective view of a main portion of an enclosure back panel of the display section shown in FIG. 1A. Display section 4 has liquid crystal display device (hereinafter referred to as "display device") 2, enclosure back panel 1, and enclosure front panel 3. Enclosure back panel 1 as an exterior enclosure covers display device 2 from behind. On the upper surface side of enclosure back panel 1, there is provided elevated portion 1A raised along ridge lines 1B. Elevated portion 1A forms top plane 1C. Elevated portion 1A is surrounded by a first pair of ridge lines 1B and a second pair of ridge lines 1D adjoining first ridge lines 1B. In front of display device 2, there is disposed enclosure front panel 3. In other words, enclosure front panel 3 and enclosure back panel 1 are fixed together with display device 2 sandwiched in between.

Enclosure back panel 1 is preferably fabricated by a press forming method of a plate material of magnesium alloy having a thickness of 0.5-0.7 mm to realize a lightweight and high strength panel. The provision of elevated portion 1A enhances the strength of enclosure back panel 1 made of such a thin-walled metal plate. Top plane 1C of elevated portion 1A has a concavely curved surface downward from ridge lines 1B. It is preferred that the curved surface is a cylindrical face as shown in FIG. 1B. In other words, it is preferred that mutually opposed two ridge lines 1D have coaxial cylindrical arc shapes. Such shapes are exaggeratedly depicted in FIGS. 1A and 1B. Although the difference in level between ridge line 1B and the bottom of the concaved portion is 0.4 mm to 0.6 mm, it is substantially unnoticeable by sight inspection because the curved surface is formed with a constant curvature.

Figure 2A:
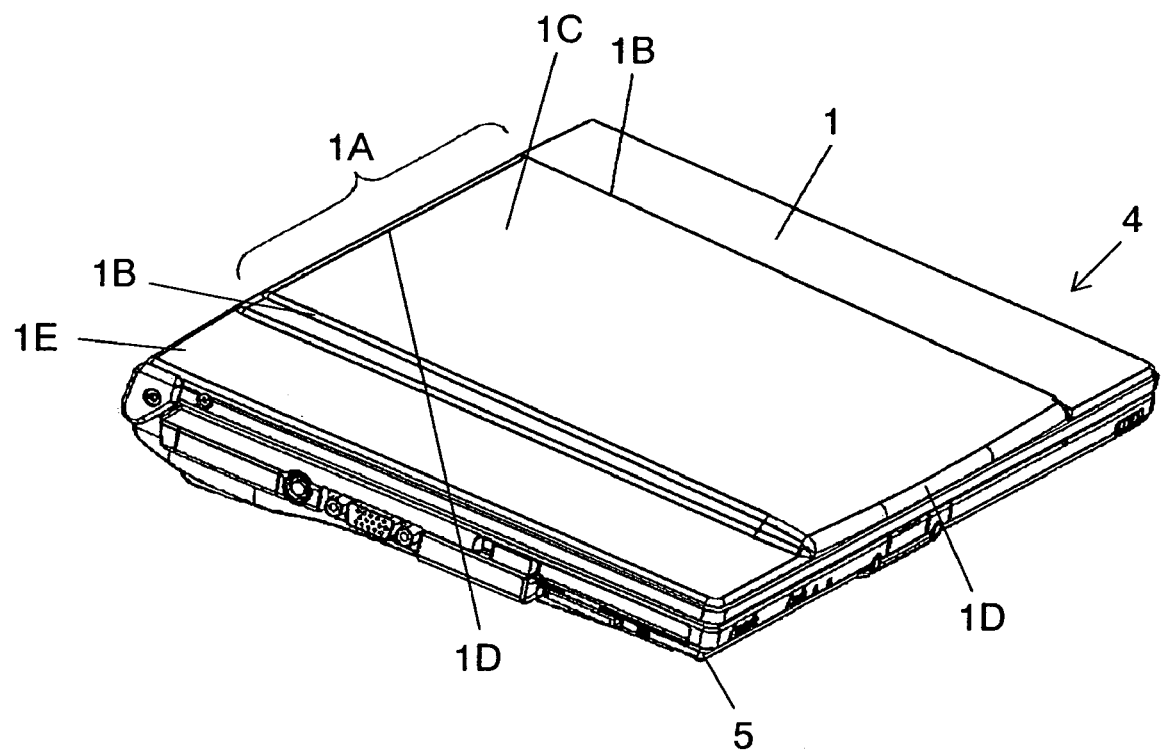
FIG. 2A is a perspective view of the portable information processor employing the enclosure back panel according to the embodiment of the present invention.
Figure 2B:
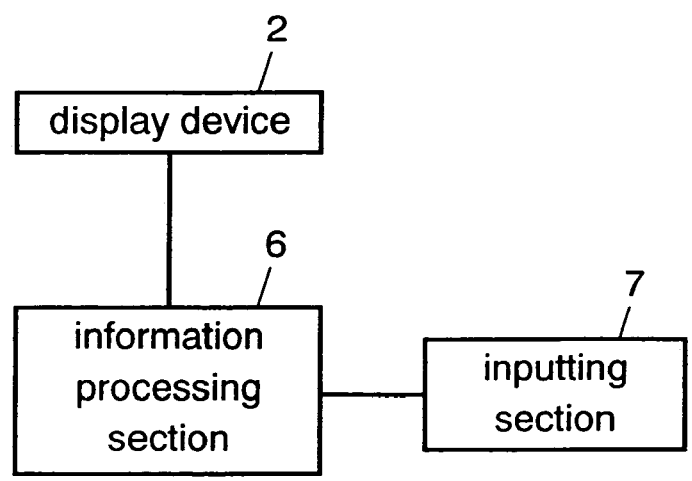
FIG. 2B is a block diagram of the portable information processor shown in FIG. 2A.

FIG. 2A is a perspective view of a portable information processor employing enclosure back panel 1 according to the present embodiment. Display section 4 is pivotably attached to main body 5. FIG. 2B is a block diagram of the portable information processor shown in FIG. 2A. Display device 2 and inputting section 7 are connected with information processing section 6. Information processing section 6 has such parts as CPU, memory, and hard disk and is built in main body 5. Inputting section 7 is made up of a keyboard, a touch panel, and a track ball provided on main body 5, or an interface with external equipment, a media drive, or a mouse connected to information processing section 6 via a cable. Inputting section 7 may be structured of a touch panel disposed on display device 2 of display section 4.

Enclosure back panel 1 of the portable information processor configured as described above is provided thereon with elevated portion 1A formed by raising a portion of the panel, for enhancing its strength. Top plane 1C provided on elevated portion 1A has a concavely curved surface downward from opposed ridge lines 1B. Therefore, even if an external force is applied to top plane 1C, tautness of the surface is maintained and the surface strength is secured. Thus, even if enclosure back panel 1 is structured of a thin-walled plate material, its strength against external forces can be secured; namely, enclosure back panel 1 lighter in weight can be obtained.

Figure 3:
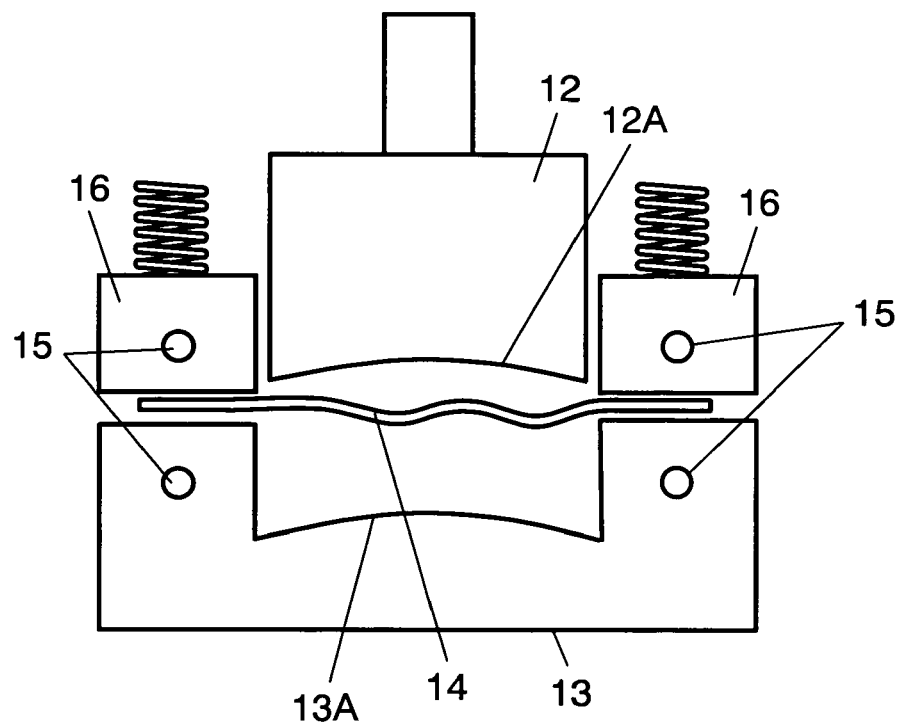
FIG. 3 is a schematic diagram of a process in which the enclosure back panel shown in FIG. 1A is fabricated by a press forming fabrication method.
Figure 4:
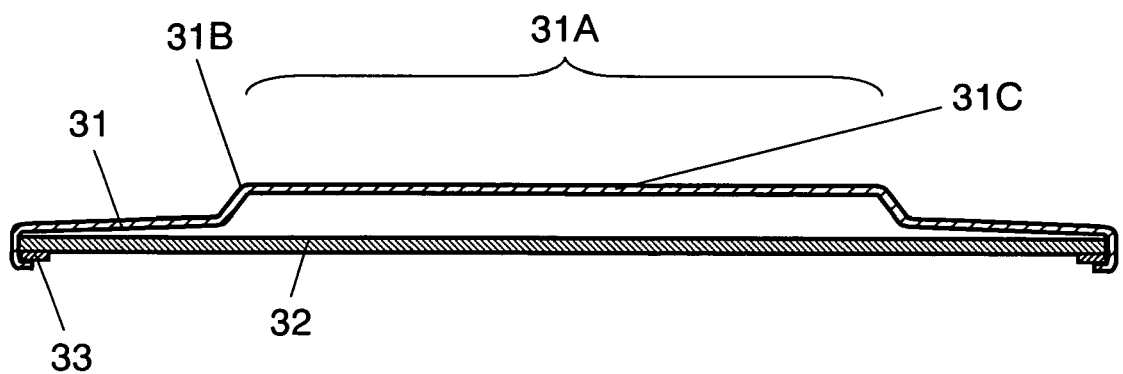
FIG. 4 is a sectional view of a structure of a display section based on design values of a conventional portable information processor.
Figure 5:
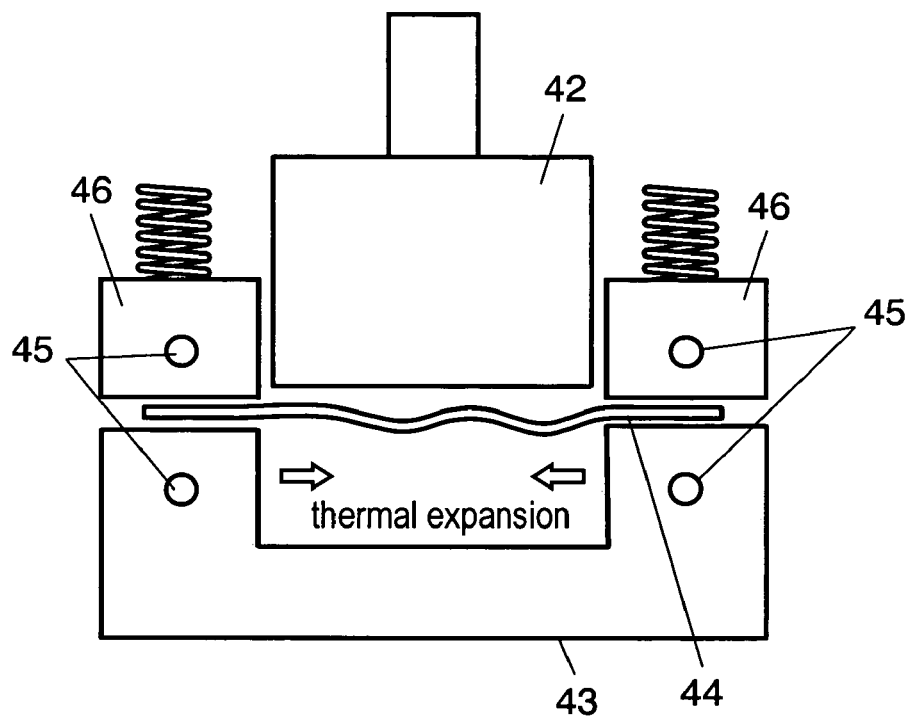
FIG. 5 is a schematic diagram of a process in which a conventional enclosure back panel is fabricated by a press forming fabrication method.
Figure 6:
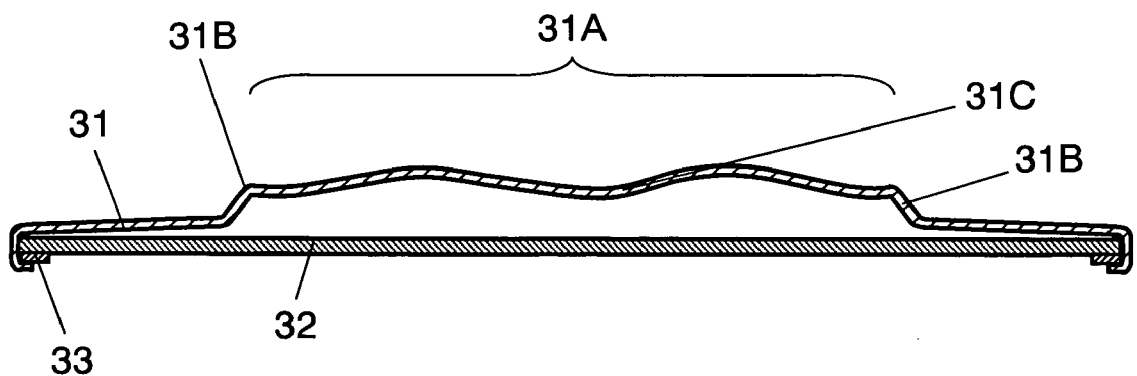
FIG. 6 is a sectional view showing a conventional enclosure back panel in exaggerated dimensions to explain its shape.

The fabrication method of enclosure back panel 1 will be described with reference to FIG. 3. FIG. 3 is a schematic diagram of a press forming process for fabricating the enclosure back panel according to the present embodiment. First, blank material 14 in a plate form made of a metallic material is fixed as sandwiched between blank holder 16 and die set 13. Blank material 14 is preferably made of magnesium alloy. Then, blank material 14, while being heated by heater 15, is press shaped by punch 12 and thus enclosure back panel 1 is fabricated.

Here, die set 13 is provided with convex portion 13A and punch 12 is provided with concave portion 12A corresponding to convex portion 13A. That is, each of punch 12 and die set 13 has a curved structure to form top plane 1C in a concave shape. Therefore, elevated portion 1A having top plane 1C as shown in FIGS. 1A and 1B can be formed.

When enclosure back panel 1 is fabricated by such a press forming method as described above, there sometimes occurs a material distortion by the press work or a distortion due to a phenomenon that volume of the material becomes more than that of necessity caused by thermal expansion. Even if such a distortion occurs, top plane 1C is prevented from becoming convex because the excess portion deforms toward the direction in which top plane 1C becomes more concave. Therefore, top plane 1C is always stably formed into a concaved shape. Thus, production yield of enclosure back panel 1 is enhanced.

In the curved surface of top plane 1C, it is preferred that mutually opposed two ridge lines 1D have coaxial cylindrical arc shapes. Thus, by having top plane 1C formed so as to have a constant curvature, concentration of external forces on a local area can be prevented and, hence, occurrence of deformation of top plane 1C when subjected to external forces can be lessened. Namely, by forming a stable shape having uniform concavity, the surface strength of enclosure back panel 1 is more enhanced.

Although an example of top plane 1C having such a curved surface that is concaved downward from two ridge lines 1B is mentioned above, the surface is not limited to that shape. Top plane 1C may be such that has a curved surface concaved downward from two ridge lines 1D. It is enough if top plane 1C has a curved surface concaved downward from one of the two pairs of mutually opposed ridge lines. In either case, it is made possible to obtain a stable shape having small material distortion under press forming work and small waviness on the surface expanded due to thermal expansion. Hence, deformation of top plane 1C occurring when it is subjected to external forces can be reduced. Also in this case, it is preferred that mutually opposed two ridge lines have coaxial cylindrical arc shapes. In other words, it is preferred that one pair of curved ridge lines of the concavely curved surface have coaxial cylindrical arc shapes.

In the present embodiment, an example in which magnesium alloy is used as the material of enclosure back panel 1 is described. Other than that, a thin-walled metallic plate material of aluminum alloy or the like may be used. In view of the strength of the overall enclosure product, however, magnesium alloy is specifically preferred.

The above described method may be applied not only to enclosure back panel 1 of enclosure back panel 1 but also to other exterior enclosure members, such as the enclosure back panel of main body 5. Further, it may be applied to both display section 4 and main body 5.

In the present embodiment, the method of manufacturing enclosure back panel 1 by a press forming method is described. However, the product may be manufactured also by a melt-shaping method. The strength of top plane 1C in this case can also be enhanced.

In the exterior enclosure of portable information processors according to the present invention, the thin-walled material is partly elevated to enhance the strength of the enclosure. Further, it is provided with a stable shape having small material distortion under press forming work and small waviness on the expanded surface due to thermal expansion. Thus, this exterior enclosure is effectively applicable to the display section of portable information processors and the like.

What is claimed is:
1. A portable information processor comprising:
    a display section incorporating therein a display device;
    a main body attached to the display section pivotably and incorporating therein an information processing section connected to the display section; and
    an exterior enclosure included in at least one of the display section and the main body having:

an elevated portion forming a top plane;
a first pair of mutually opposed ridge lines located at opposed edges of the elevated portion; and
a second pair of mutually opposed ridge lines located at opposed edges of the elevated portion, in abutment with the first pair of ridge lines,
wherein the top plane has a concavely curved surface with respect to one of the first pair of ridge lines and the second pair of ridge lines.

2. An exterior enclosure for a portable information processor, said exterior enclosure comprising:
a base portion having a bottom face facing inwardly toward an interior of said exterior enclosure and a top face facing outwardly toward an exterior of said exterior enclosure;
an elevated portion forming a top plane and being raised outwardly from said base portion;
a pair of mutually opposed first ridges projecting outwardly and defining first opposing sides of said elevated portion; and
a pair of mutually opposed second ridges projecting outwardly and defining second opposing sides of said elevated portion;
wherein said mutually opposed second ridges are in abutment with said mutually opposed first ridges such that said pairs of said first and second ridges together surround said elevated portion; and
wherein said top plane formed by said elevated portion is an outwardly concave surface which curves inwardly from each of said first ridges.

3. The exterior enclosure according to claim 2, wherein said mutually opposed second ridges are curved to have coaxial cylindrical arc shapes, when viewed in an inward direction.

4. The exterior enclosure according to claim 2, wherein said exterior enclosure is formed of magnesium alloy.

5. The exterior enclosure according to claim 2, wherein said base portion, said elevated portion and said pairs of said first and second ridges together constitute an enclosure back panel; and
an enclosure front panel is connected to outer edges of said enclosure back panel such that said enclosure front panel and said enclosure back panel are together configured to enclose a display device of the portable information processor.

6. A method of manufacturing an exterior enclosure for a portable information processor, said method comprising:
fixing a plate-shaped metallic blank material in place;
heating the blank material; and
pressing the blank material in a heated condition to thereby form
a base portion having a bottom face facing inwardly toward an interior of said exterior enclosure and a top face facing outwardly toward an exterior of said exterior enclosure,
an elevated portion forming a top plane and being raised outwardly from said base portion,
a pair of mutually opposed first ridges projecting outwardly and defining first opposing sides of said elevated portion, and
a pair of mutually opposed second ridges projecting outwardly and defining second opposing sides of said elevated portion,
wherein said mutually opposed second ridges are in abutment with said mutually opposed first ridges such that said pairs of said first and second ridges together surround said elevated portion, and
wherein said top plane formed by said elevated portion is an outwardly concave surface which curves inwardly from each of said first ridges.

7. The method according to claim 6, wherein
said pressing is carried out so that said mutually opposed second ridges are curved to have coaxial cylindrical arc shapes, when viewed in an inward direction.

8. The method according to claim 6, wherein
said plate-shaped metallic blank material is formed of magnesium alloy.

9. A portable information processor comprising:
a display section incorporating therein a display device;
a main body pivotably attached to said display section, said main body incorporating an information processing section connected to said display section;
an exterior enclosure included in at least one of said display section and said main body, said exterior enclosure comprising
a base portion having a bottom face facing inwardly toward an interior of said exterior enclosure and a top face facing outwardly toward an exterior of said exterior enclosure,
an elevated portion forming a top plane and being raised outwardly from said base portion,
a pair of mutually opposed first ridges projecting outwardly and defining first opposing sides of said elevated portion,
a pair of mutually opposed second ridges projecting outwardly and defining second opposing sides of said elevated portion,
wherein said mutually opposed second ridges are in abutment with said mutually opposed first ridges such that said pairs of said first and second ridges together surround said elevated portion, and
wherein said top plane formed by said elevated portion is an outwardly concave surface which curves inwardly from each of said first ridges.

10. The portable information processor according to claim 9, wherein
said pair of mutually opposed second ridges are curved to have coaxial cylindrical arc shapes, when viewed in an inward direction.

11. The portable information processor according to claim 9, wherein
said exterior enclosure is formed of magnesium alloy.

12. The portable information processor according to claim 9, wherein
said base portion, said elevated portion and said pairs of said first and second ridges together constitute an enclosure back panel; and
an enclosure front panel is connected to outer edges of said enclosure back panel such that said enclosure front panel and said enclosure back panel are together configured to enclose a display device of the portable information processor.

* * * * *

UNITED STATES PATENT AND TRADEMARK OFFICE
CERTIFICATE OF CORRECTION

PATENT NO.        : 7,224,580 B2
APPLICATION NO.   : 11/219778
DATED             : May 29, 2007
INVENTOR(S)       : Isao Shimada et al.

It is certified that error appears in the above-identified patent and that said Letters Patent is hereby corrected as shown below:

On the Title Page

On page 1, right column, item (56), References Cited, under U.S. Patent Documents, line 13, please change "2004/0241528 A1 *  12/2004 MacColl et al. ............ 206/232" to --2004/0245128 A1*  12/2004 MacColl et al. ............ 206/232--.

Signed and Sealed this

Eighteenth Day of September, 2007

JON W. DUDAS
*Director of the United States Patent and Trademark Office*